(12) United States Patent
Yoo et al.

(10) Patent No.: US 11,787,231 B2
(45) Date of Patent: Oct. 17, 2023

(54) HUB BUILT-IN TYPE CONSTANT VELOCITY JOINT

(71) Applicants: Hyundai Motor Company, Seoul (KR); Kia Motors Corporation, Seoul (KR); HYUNDAI WIA Corporation, Changwon-si (KR)

(72) Inventors: Sung Su Yoo, Suwon-Si (KR); Won Jun Choi, Yangsan-si (KR); Hee Il Kim, Hwaseong-si (KR); Soo Kyoung Lee, Hwaseong-si (KR); Bum Jae Lee, Yongin-si (KR); Chang Hee Jeong, Yongin-si (KR)

(73) Assignees: Hyundai Motor Company, Seoul (KR); Kia Motors Corporation, Seoul (KR); HYUNDAI WIA Corporation, Changwon-si (KR)

( * ) Notice: Subject to any disclaimer, the term of this patent is extended or adjusted under 35 U.S.C. 154(b) by 502 days.

(21) Appl. No.: 17/039,537

(22) Filed: Sep. 30, 2020

(65) Prior Publication Data

US 2021/0394553 A1    Dec. 23, 2021

(30) Foreign Application Priority Data

Jun. 19, 2020   (KR) .................. 10-2020-0075114

(51) Int. Cl.
*B60B 27/00* (2006.01)
*F16D 3/223* (2011.01)

(52) U.S. Cl.
CPC .... *B60B 27/0042* (2013.01); *B60B 2310/204* (2013.01); *B60B 2310/208* (2013.01); *B60B 2900/211* (2013.01); *F16D 3/223* (2013.01); *F16D 2250/0023* (2013.01)

(58) Field of Classification Search
CPC . B60B 27/0042; B60B 27/00; B60B 27/0036; B60B 27/0052; B60B 7/0013; B60B 7/002
See application file for complete search history.

(56) References Cited

U.S. PATENT DOCUMENTS

| | | | | |
|---|---|---|---|---|
| 9,493,035 | B2* | 11/2016 | Bosco | F16C 33/586 |
| 10,369,840 | B2* | 8/2019 | Sguotti | F16D 3/2245 |
| 11,536,313 | B2* | 12/2022 | Park | B60B 27/0005 |
| 2017/0282644 | A1 | 10/2017 | Sguotti et al. | |
| 2021/0362544 | A1* | 11/2021 | Yoo | B60B 27/0042 |
| 2021/0370716 | A1* | 12/2021 | Kim | F16D 3/30 |
| 2022/0258530 | A1* | 8/2022 | Jeong | B60B 27/0005 |
| 2022/0410624 | A1* | 12/2022 | Yoo | B60B 27/0073 |

* cited by examiner

*Primary Examiner* — Jason R Bellinger
(74) *Attorney, Agent, or Firm* — MORGAN, LEWIS & BOCKIUS LLP

(57) ABSTRACT

A hub built-in type constant velocity joint may include a plurality of wheel guide coupling portions to which wheel guides are configured to be coupled, and a hub housing which is formed between the wheel guide coupling portions and in which a discharge portion is formed to be stepped with each of the wheel guide coupling portions and configured to discharge foreign materials to the outside.

13 Claims, 6 Drawing Sheets

HUB BUILT-IN TYPE CONSTANT VELOCITY JOINT

CROSS REFERENCE TO RELATED APPLICATION

The present application claims priority to Korean Patent Application No. 10-2020-0075114 filed on Jun. 19, 2020, the entire contents of which is incorporated herein for all purposes by this reference.

BACKGROUND OF THE PRESENT INVENTION

Field of the Invention

The present invention relates to a constant velocity joint, and more particularly, to a hub built-in type constant velocity joint having a structure of allowing foreign materials and moisture, which are introduced into the hub built-in type constant velocity joint in which a hub housing and an external ring of a constant velocity joint are integrated, to be easily discharged.

Description of Related Art

Generally, hubs and bearings are mounted in tire wheels connected to a drive axle and used to withstand loads in an upward-downward direction and a front and rear direction of a vehicle and a horizontal load when the vehicle is turning. In addition, a constant velocity joint is mounted in the drive axle of the vehicle and used to transmit power transmitted from a transmission to wheels. Furthermore, it is common that the constant velocity joint, the hubs, and the bearings are organically assembled by engagement members to be used as one unit.

Meanwhile, the constant velocity joint is mounted in the wheel of the vehicle through a wheel guide. When foreign materials and moisture are introduced into the constant velocity joint through the wheel guide, a malfunction may occur. Thus, it is necessary to develop technology for a structure which allows the foreign materials and the moisture introduced into the constant velocity joint to be easily discharged to the outside.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hub built-in type constant velocity joint having a structure of allowing foreign materials and moisture, which are introduced into the hub built-in type constant velocity joint in which a hub housing and an external ring of a constant velocity joint are integrated, to be easily discharged.

According to one aspect, there is provided a hub built-in type constant velocity joint including a plurality of wheel guide coupling portions to which wheel guides are configured to be coupled, and a hub housing which is formed between the wheel guide coupling portions and in which a discharge portion is formed to be stepped with each of the wheel guide coupling portions and configured to discharge foreign materials to the outside.

The wheel guide coupling portion may be formed along an inner circumference of an open surface of the hub housing, and the discharge portion may be formed between the wheel guide coupling portions along the inner circumference of the open surface of the hub housing to be stepped with the plurality of wheel guide coupling portions.

The hub housing may further include a flange to be mounted in a brake disc, and the discharge portion may be formed to be stepped between the wheel guide coupling portions to form the inner circumference of the open surface of the hub housing to be concave to an edge portion of the flange.

The number of the wheel guide coupling portions may be equal to the number of the discharge portions.

A stopper limiting a depth into which the wheel guide is press-inserted may be formed in the plurality of wheel guide coupling portions.

The wheel guide may include a wheel mounting portion configured to guide a center ring of a wheel when the wheel is mounted, a disc mounting portion configured to guide a center ring of a brake disc when the brake disc is mounted, and a coupling portion coupled to the plurality of wheel guide coupling portions.

The wheel mounting portion and the disc mounting portion may be formed to be stepped with each other.

The wheel guide may be manufactured by forging molding or press molding.

The methods and apparatuses of the present invention have other features and advantages which will be apparent from or are set forth in more detail in the accompanying drawings, which are incorporated herein, and the following Detailed Description, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE PRESENT INVENTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a hub built-in type constant velocity joint according to exemplary embodiments of the present invention will be described with reference to the accompanying drawings.

Figure 1:
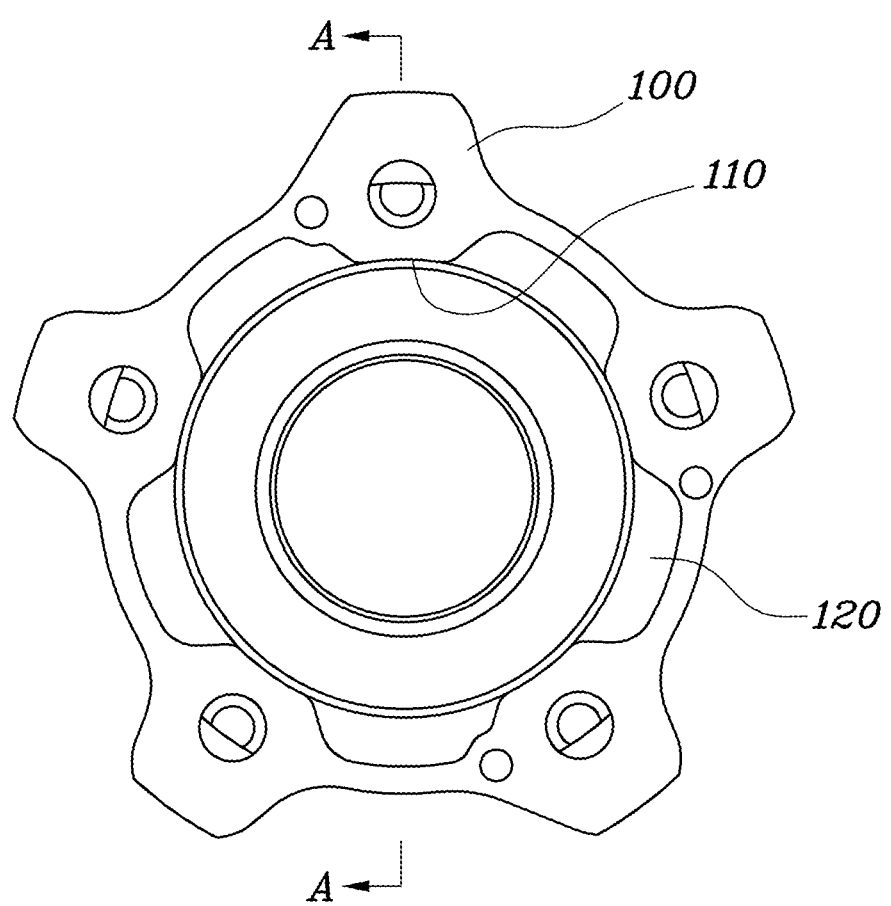
FIG. 1 is a diagram illustrating a hub built-in type constant velocity joint according to various exemplary embodiments of the present invention.
Figure 2:
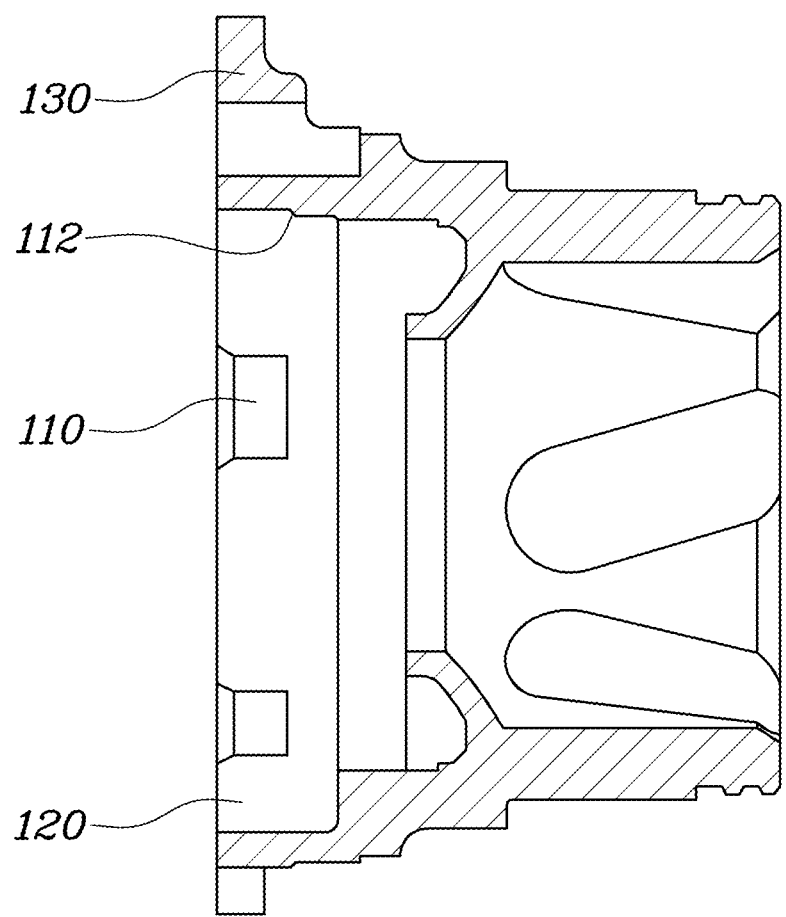
FIG. 2 is a cross-sectional view taken along line A-A of FIG. 1.
Figure 3:
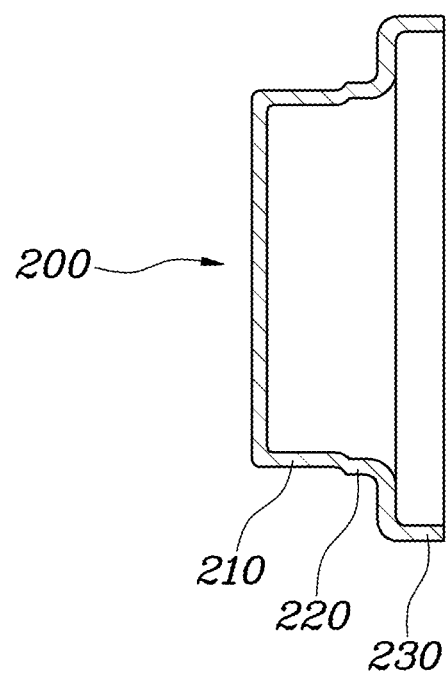
FIG. 3 is a diagram illustrating a wheel guide coupled to the hub built-in type constant velocity joint according to various exemplary embodiments of the present invention.
Figure 4:
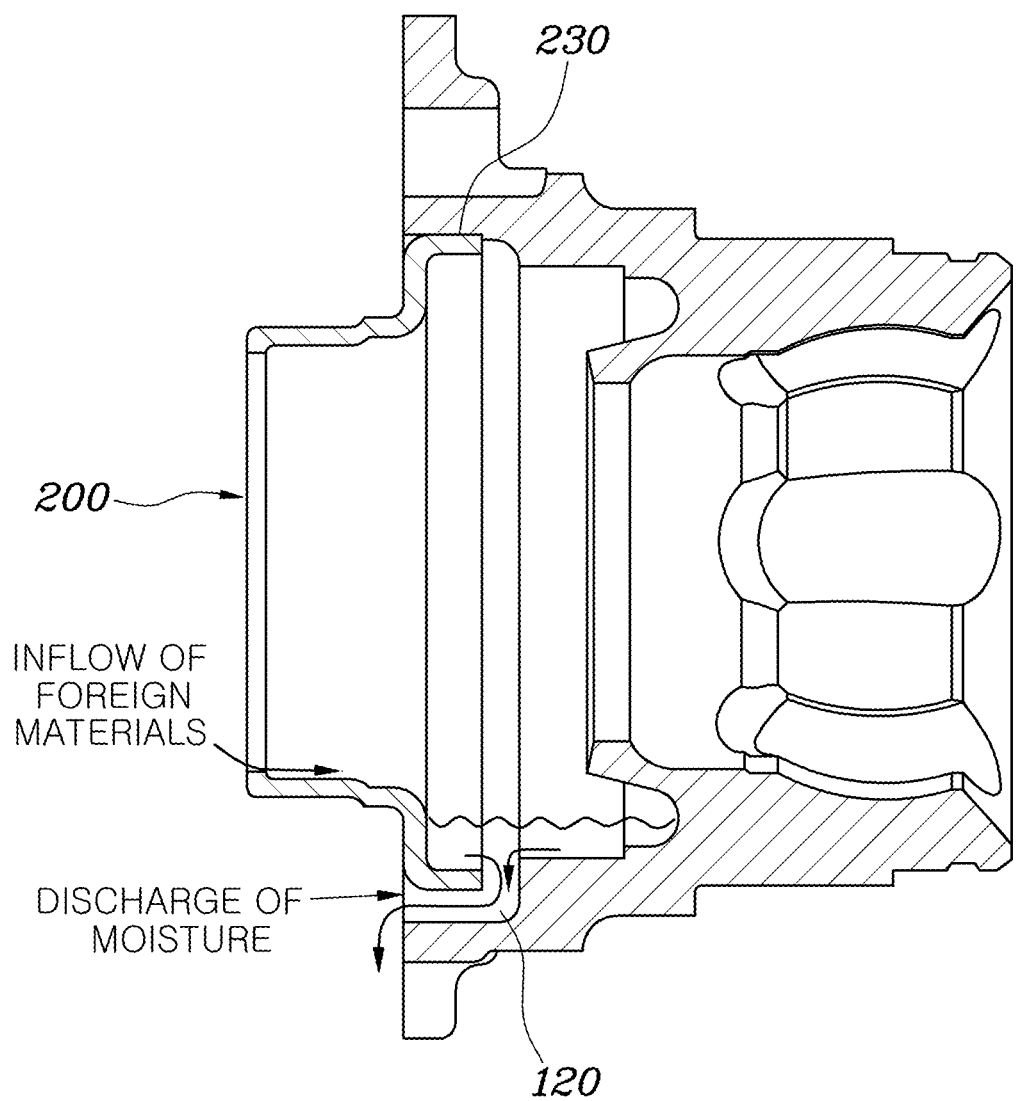
FIG. 4 is a diagram illustrating a case in which foreign materials and moisture inside the hub built-in type constant velocity joint are discharged to the outside in a state in which the wheel guide is coupled to the hub built-in type constant velocity joint according to various exemplary embodiments of the present invention.
Figure 5:
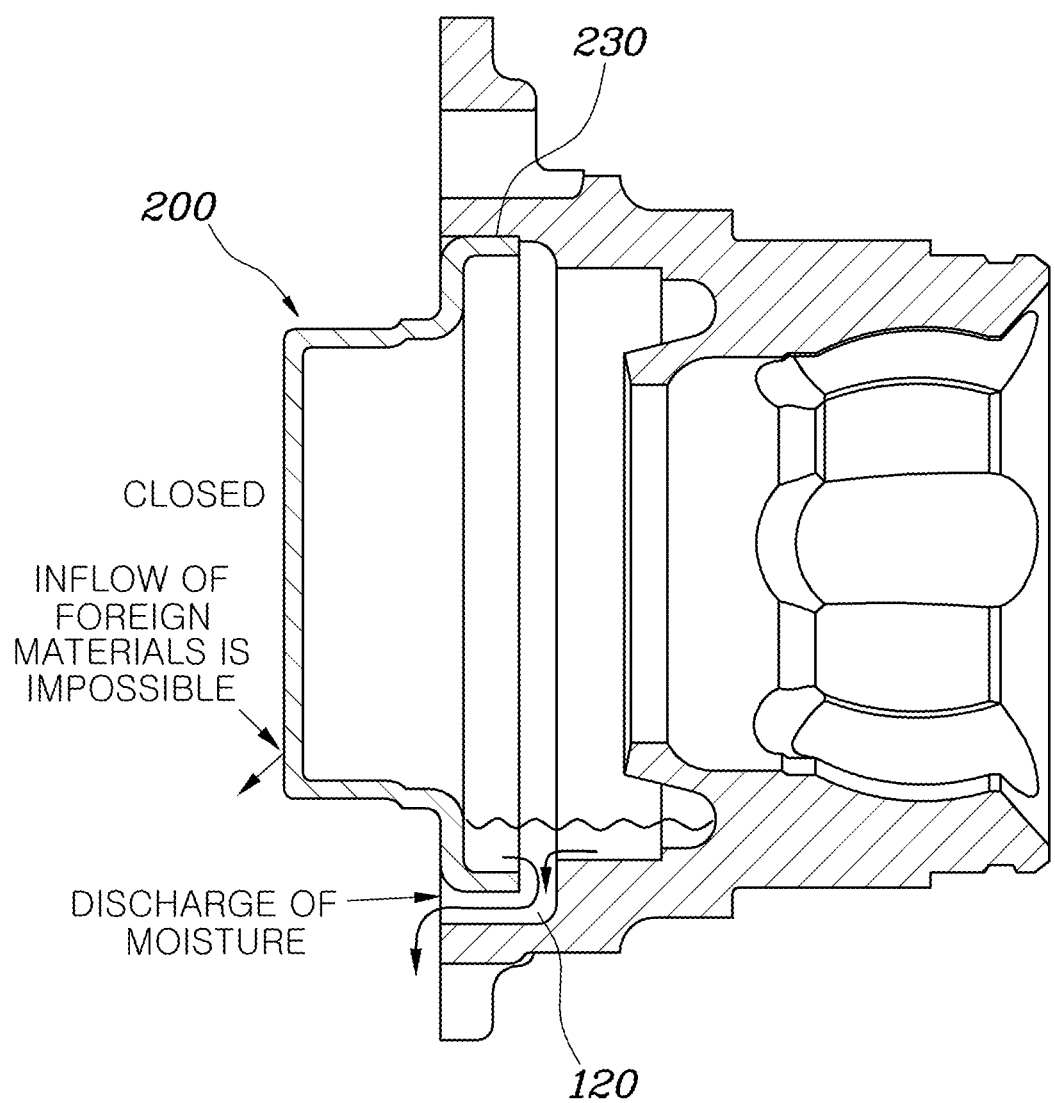
FIG. 5 is a diagram illustrating a case in which the moisture inside the hub built-in type constant velocity joint is discharged to the outside in the state in which the wheel guide is coupled to the hub built-in type constant velocity joint according to various exemplary embodiments of the present invention.
Figure 6:
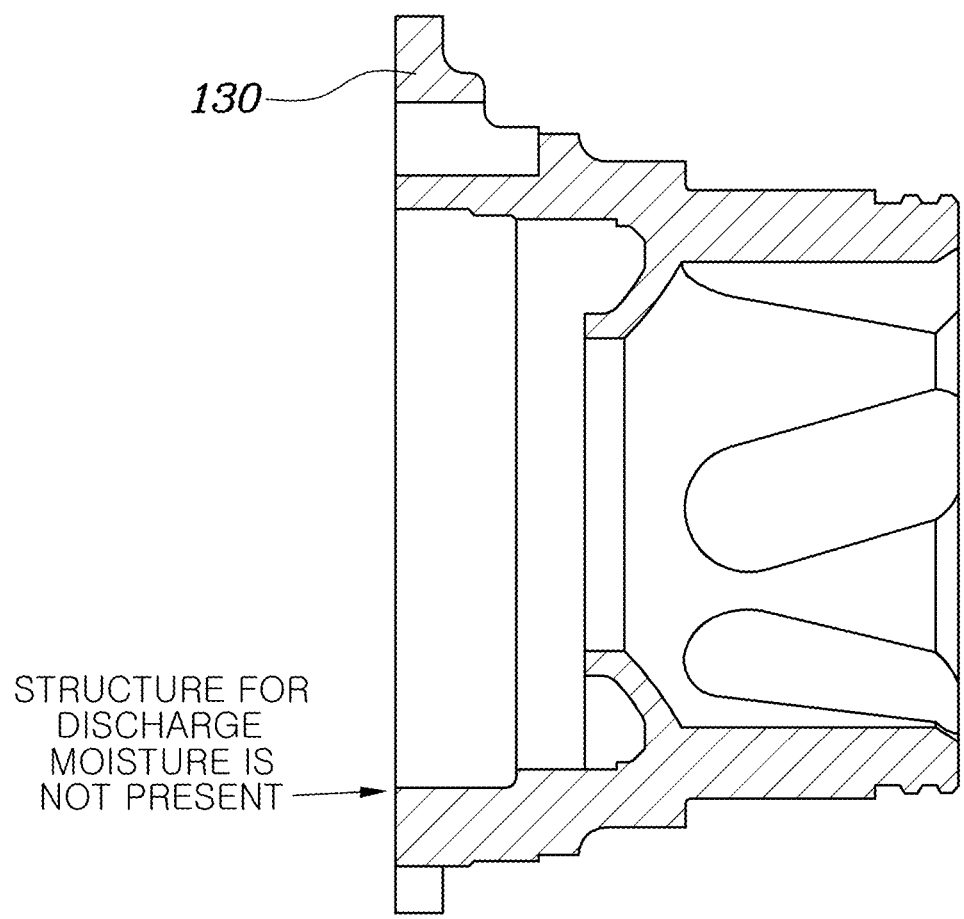
FIG. 6 is a cross-sectional view exemplarily illustrating a conventional constant velocity joint in which a discharge portion is not formed.

FIG. 1 is a diagram illustrating a hub built-in type constant velocity joint according to various exemplary embodiments of the present invention, FIG. 2 is a cross-sectional view taken along line A-A of FIG. 1, FIG. 3 is a diagram illustrating a wheel guide coupled to the hub built-in type constant velocity joint according to various exemplary embodiments of the present invention, FIG. 4 is a diagram illustrating a case in which foreign materials and moisture inside the hub built-in type constant velocity joint are discharged to the outside in a state in which the wheel guide is coupled to the hub built-in type constant velocity joint according to various exemplary embodiments of the present invention, FIG. 5 is a diagram illustrating a case in which the moisture inside the hub built-in type constant velocity joint is discharged to the outside in the state in which the wheel guide is coupled to the hub built-in type constant velocity joint according to various exemplary embodiments of the present invention, and FIG. 6 is a cross-sectional view exemplarily illustrating a conventional constant velocity joint in which a discharge portion is not formed.

Referring to FIG. 1 and FIG. 2, the hub built-in type constant velocity joint according to various exemplary embodiments of the present invention may include a plurality of wheel guide coupling portions 110 to which a wheel guide 200 is coupled, and a hub housing 100 which is formed between the wheel guide coupling portions 110 to be stepped with each of the wheel guide coupling portions 110 and in which a discharge portion 120 is formed to allow foreign materials in the hub housing 100 to be discharged to the outside.

In addition, the hub housing 100 may further include a flange 130 mounted on a brake disc. In the instant case, the flange 130 may be a surface mounted on the brake disc and may be formed parallel to a mounting surface of a wheel.

The hub housing 100 has a shape in which a wheel hub and an external ring of a constant velocity joint are integrated. A constant velocity joint may be coupled to an internal side of the hub housing 100 to transmit a drive torque transmitted from an engine to the wheel. Simultaneously, the hub housing 100 may also serve as an internal ring of a wheel bearing to support a load of the vehicle.

As described above, the hub housing 100 is formed by integrating the wheel hub with the external ring of the constant velocity joint so that a center of the constant velocity joint is moved to the outside of the vehicle. Thus, a length of a drive shaft may be increased so that a joint angle of the drive shaft of the constant velocity joint may be improved.

In addition, since the hub housing 100 is formed by integrating the wheel hub with the external ring of the constant velocity joint, it is possible to reduce a weight and manufacturing costs by omitting a conventional connection member between the wheel hub and the constant velocity joint, improve driving fuel efficiency through the reduction in weight, solve noise problem due to the connection member, and solve a quality problem due to a loosening of a wheel hub nut which fixes a constant velocity joint housing to the wheel hub.

Meanwhile, referring to FIG. 1 and FIG. 2, the wheel guide coupling portion 110 may be formed along an inner circumference of an open surface of the hub housing 100. In addition, the discharge portion 120 may be formed between the wheel guide coupling portions 110. The discharge portion 120 may be formed to be stepped with the wheel guide coupling portion 110 along the inner circumference of the open surface of the hub housing 100.

In an exemplary embodiment of the present invention, the discharge portion 120 is formed to be stepped in a radial direction of the open surface of the hub housing 100.

When the wheel guide 200 is coupled, a stopper 112 for limiting a depth at which the wheel guide 200 is coupled may be formed in the wheel guide coupling portion 110. According to various exemplary embodiments of the present invention, the wheel guide 200 may be press-inserted into and coupled to the wheel guide coupling portion 110 of the hub housing 100. In the instant case, the stopper 112 may limit a depth into which the wheel guide 200 is press-inserted.

As described above, according to the hub built-in type constant velocity joint according to various exemplary embodiments of the present invention, the stopper 112 is formed in the wheel guide coupling portion 110 and the depth of the wheel guide 200 press-inserted into the wheel guide coupling portion 110 through the stopper 112 is limited. Therefore, when the wheel guide 200 is press-inserted into and coupled to the wheel guide coupling portion 110, an appropriate press-inserted depth of the wheel guide 200 may be easily determined so that work efficiency may be improved.

According to various exemplary embodiments of the present invention, as shown in FIG. 2, the stopper 112 may be formed to be stepped with a surface of the wheel guide coupling portion 110 of the hub housing 100 which is in surface contact with a coupling portion 230 of the wheel guide 200 and may limit a depth in which the wheel guide 200 is coupled to the internal side of the hub housing 100 due to the step structure. However, this is merely an example, and various structures or devices other than the wheel guide 200 may be applied as the stopper 112 in various exemplary embodiments of the present invention as long as they can limit the depth in which the wheel guide 200 is coupled to the hub housing 100.

Meanwhile, referring to FIG. 1 and FIG. 2, the discharge portion 120 is formed between the wheel guide coupling portions 110. The discharge portion 120 may be formed to be stepped with the wheel guide coupling portion 110 to extend the inner circumference of the open surface of the hub housing 100 to an edge portion of the flange 130.

That is, since the discharge portion 120 is formed between the wheel guide coupling portions 110 and formed to be stepped with the wheel guide coupling portion 110 to extend the inner circumference of the open surface of the hub housing 100 to an edge portion of the flange 130, when the wheel guide 200 is mounted in the hub housing 100, the coupling portion 230 of the wheel guide 200 is coupled to the wheel guide coupling portion 110 of the hub housing 100. A space may be formed between the discharge portion 120 and a distal end surface of the coupling portion 230 of the wheel guide 200, and thus foreign materials and moisture which are introduced into the constant velocity joint may be discharged to the outside through the space formed between the discharge portion 120 and a distal end surface of the coupling portion 230 of the wheel guide 200.

According to various exemplary embodiments of the present invention, in the hub built-in type constant velocity joint according to various exemplary embodiments of the present invention, the number of wheel guide coupling portions 110 are equal to the number of discharge portions 120. For example, as shown in FIG. 1, when five wheel guide coupling portions 110 are formed in the hub housing 100, five discharge portions 120 may be formed to correspond to the five wheel guide coupling portions 110. However, FIG. 1 illustrates the hub built-in type constant velocity joint according to various exemplary embodiments of the present invention, and the number of wheel guide coupling portions 110 and the number of discharge portions 120 which are formed in the hub housing 100 are not limited thereto.

Meanwhile, a disassembly hole for disassembling the constant velocity joint when a failure occurs in an internal component of the constant velocity joint may be formed in the hub built-in type constant velocity joint according to various exemplary embodiments of the present invention.

Meanwhile, referring to FIG. 3, the wheel guide 200 coupled to the hub built-in type constant velocity joint according to various exemplary embodiments of the present invention may include a wheel mounting portion 210, a disc mounting portion 220, and the coupling portion 230.

When the wheel is mounted, the wheel mounting portion 210 is configured to guide a center ring of the wheel. In the instant case, the wheel mounting portion 210 is concentric with a rotation axis of the wheel bearing mounted in the hub housing 100. Here, the reason why a center of the wheel mounting portion 210 may be concentric with the rotation axis of the wheel bearing is that, when the center of the wheel mounting portion 210 and a center of the rotation axis of the wheel bearing do not match, vibration may occur due to an imbalance of a rotational weight.

When the brake disc is mounted, the disc mounting portion 220 is configured to guide a center ring of the brake disc. In the instant case, like the wheel mounting portion 210, the disc mounting portion 220 is concentric with the rotation axis of the wheel bearing mounted in the hub housing 100. Here, the reason why a center of the disc mounting portion 220 may be concentric with the rotation axis of the wheel bearing is that, when the center of the disc mounting portion 220 and the center of the rotation axis of the wheel bearing do not match, vibration may occur due to an imbalance of a rotational weight.

Meanwhile, as shown in FIG. 3, the wheel mounting portion 210 and the disc mounting portion 220 may be formed to be stepped with each other.

In an exemplary embodiment of the present invention, a diameter of the wheel mounting portion 210 is smaller than a diameter of the disc mounting portion 220.

The coupling portion 230 may be coupled to the wheel guide coupling portion 110. When the wheel guide 200 is press-inserted into and coupled to the wheel guide coupling portion 110, a circumferential surface of the coupling portion 230 may be in surface contact with the surface of the wheel guide coupling portion 110, and the distal end surface of the coupling portion 230 may come into contact with the stopper 112 of the hub housing 100 to limit a depth into which the wheel guide 200 is press-inserted.

According to various exemplary embodiments of the present invention, a disassembly hole for disassembling the constant velocity joint when a failure occurs in an internal component of the constant velocity joint may be formed in the wheel guide 200. According to another exemplary embodiment of the present invention, the disassembly hole may not be formed in the wheel guide 200.

As shown in FIG. 4, according to the hub built-in type constant velocity joint according to various exemplary embodiments of the present invention, which has the above-described structure, in a state in which the wheel guide 200 having the disassembly hole formed therein is coupled to the hub housing 100, foreign materials and moisture inside the constant velocity joint may be discharged to the outside through the discharge portion 120. In addition, as shown in FIG. 5, in a state in which the wheel guide 200 in which the disassembly hole is not formed is coupled to the hub housing 100, moisture inside the constant velocity joint may be discharged to the outside through the discharge portion 120.

Meanwhile, the wheel guide 200 coupled to the hub built-in type constant velocity joint according to various exemplary embodiments of the present invention may be manufactured as a separate product from the hub housing 100. The wheel guide 200 may be manufactured by forging molding or press molding, and external diameters of the wheel mounting portion 210, the disc mounting portion 220, and the coupling portion 230 may be manufactured through lathe machining.

The hub built-in type constant velocity joint according to various exemplary embodiments of the present invention, which has the above-described structural features, has the following effects.

First, it is possible to manufacture the wheel guide 200 coupled to the hub housing 100 as a separate product through forging molding to thereby reduce a weight, and even when the wheel guide 200, which is manufactured the separate product through forging molding, is coupled to the hub housing 100, it is possible to easily discharge foreign materials and moisture which are introduced into the constant velocity joint to the outside through the structure of the discharge portion 120.

In addition, referring to FIG. 6, when compared with a conventional constant velocity joint in which the discharge portion 120 is not formed, the step is formed in the hub housing 100 to form the discharge portion 120 so that a weight may be reduced by as much as the weight of the discharge portion 120.

In accordance with various aspects of the present invention, it is possible to easily discharge foreign materials and moisture introduced into a constant velocity joint to the outside through a discharge portion.

In addition, the discharge portion is formed in a hub housing so that a weight of the hub housing may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hub built-in type constant velocity joint comprising:
   a plurality of wheel guide coupling portions to which a wheel guide is configured to be coupled; and
   a hub housing formed between the plurality of wheel guide coupling portions, wherein the hub housing includes at least one discharge portion formed as a step with each of the plurality of wheel guide coupling portions and configured to discharge foreign materials from an inner space of the hub housing to an outside of the hub housing.

2. The hub built-in type constant velocity joint of claim 1, wherein the plurality of wheel guide coupling portions is formed along an inner circumference of an open surface of the hub housing; and
   wherein the at least one discharge portion is formed between the plurality of wheel guide coupling portions along the inner circumference of the open surface of the hub housing and formed as a step with the plurality of wheel guide coupling portions.

3. The hub built-in type constant velocity joint of claim 2, wherein the hub housing further includes a flange to be mounted in a brake disc; and
   wherein the at least one discharge portion is formed as a step between the plurality of wheel guide coupling portions to form the inner circumference of the open surface of the hub housing to be concave toward an edge portion of the flange.

4. The hub built-in type constant velocity joint of claim 3, wherein the at least one discharge portion is formed as a step in a radial direction of the open surface of the hub housing.

5. The hub built-in type constant velocity joint of claim 1, wherein a number of the plurality of wheel guide coupling portions is equal to a number of the at least one discharge portion.

6. The hub built-in type constant velocity joint of claim 1, wherein a stopper limiting a depth into which the wheel guide is press-inserted in the hub housing is formed in at least one of the plurality of wheel guide coupling portions.

7. The hub built-in type constant velocity joint of claim 6, wherein the wheel guide includes:
   a wheel mounting portion configured to guide a center ring of a wheel when the wheel is mounted;
   a disc mounting portion configured to guide a center ring of a brake disc when the brake disc is mounted; and
   a coupling portion configured to be coupled to the plurality of wheel guide coupling portions, wherein the coupling portion is accommodated on the stopper when the wheel guide is press-inserted in the hub housing.

8. The hub built-in type constant velocity joint of claim 7, wherein the wheel mounting portion and the disc mounting portion are formed as a step with each other.

9. The hub built-in type constant velocity joint of claim 8, wherein a diameter of the wheel mounting portion is smaller than a diameter of the disc mounting portion.

10. The hub built-in type constant velocity joint of claim 1, wherein the wheel guide includes:
    a wheel mounting portion configured to guide a center ring of a wheel when the wheel is mounted;
    a disc mounting portion configured to guide a center ring of a brake disc when the brake disc is mounted; and
    a coupling portion configured to be coupled to the plurality of wheel guide coupling portions.

11. The hub built-in type constant velocity joint of claim 10, wherein the wheel mounting portion and the disc mounting portion are formed as a step with each other.

12. The hub built-in type constant velocity joint of claim 11, wherein a diameter of the wheel mounting portion is smaller than a diameter of the disc mounting portion.

13. The hub built-in type constant velocity joint of claim 1, wherein the wheel guide is manufactured by forging molding or press molding.

* * * * *